US011917734B2

(12) United States Patent
Ding et al.

(10) Patent No.: US 11,917,734 B2
(45) Date of Patent: Feb. 27, 2024

(54) DRIVER DEVICE LAYOUTS

(71) Applicant: TEXAS INSTRUMENTS INCORPORATED, Dallas, TX (US)

(72) Inventors: Shang Ding, Shanghai (CN); Huibo Zhong, Shanghai (CN); Bin Hu, Shanghai (CN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 18/125,931

(22) Filed: Mar. 24, 2023

(65) Prior Publication Data

US 2023/0232513 A1 Jul. 20, 2023

Related U.S. Application Data

(63) Continuation of application No. 17/489,228, filed on Sep. 29, 2021, now Pat. No. 11,647,570.

(60) Provisional application No. 63/236,592, filed on Aug. 24, 2021.

(51) Int. Cl.

*G09G 3/32* (2016.01)
*H05B 45/30* (2020.01)
*H05B 45/40* (2020.01)

(52) U.S. Cl.

CPC ............. *H05B 45/30* (2020.01); *H05B 45/40* (2020.01)

(58) Field of Classification Search

CPC ...... G09G 3/32; G09G 3/3275; G09G 3/3266; G09G 3/342; G09G 3/296; G09G 3/3233; H05B 45/30; H05B 45/40; H05B 45/44

See application file for complete search history.

(56) References Cited

U.S. PATENT DOCUMENTS

| | | | | |
|---|---|---|---|---|
| 10,971,057 B2 * | 4/2021 | Jung | ........................ | G09G 3/32 |
| 2009/0284445 A1 * | 11/2009 | Kuo | ........................ | H05B 47/18 345/82 |
| 2018/0261149 A1 * | 9/2018 | Lin | ........................ | H01L 25/167 |
| 2019/0051253 A1 * | 2/2019 | Shin | ........................ | G06F 1/3265 |

OTHER PUBLICATIONS

TLC6983 48×16 Common Cathode Matrix LED Display Driver With Ultra Low Power; Texas Instruments; Dec. 2020; 15 Pgs.

* cited by examiner

*Primary Examiner* — Thai Pham

(74) *Attorney, Agent, or Firm* — Charles F. Koch; Frank D. Cimino

(57) ABSTRACT

An example circuit includes a substrate having a plurality of scan lines substantially orthogonal to a virtual centerline of the substrate. The circuit also includes a first driver integrated circuit (IC) on the substrate, the first driver IC including: a set of line switches coupled to a first set of the plurality of scan lines along a side of the first driver IC nearest the virtual centerline; a data output and a register. The circuit also includes a second driver IC on the substrate, the second driver IC including: a set of line switches coupled to a second set of the plurality of scan lines along a side of the second IC nearest the virtual centerline; and a data input coupled to the data output of the first driver IC.

20 Claims, 6 Drawing Sheets

DRIVER DEVICE LAYOUTS

CROSS-REFERENCE TO RELATED APPLICATIONS

This application is a continuation of prior application Ser. No. 17/489,228 filed Sep. 29, 2021, currently pending, which claims priority to U.S. Provisional patent application No. 63/236,592, filed Aug. 24, 2021, both of which are incorporated herein by reference in their entirety.

TECHNICAL FIELD

This description relates to driver layouts, such as for display devices.

BACKGROUND

Light emitting diodes (LEDs) are used for a variety of purposes. For example, LEDs are used as light sources for displays, light sources for automobiles, and as light sources for other illumination. In some examples, a display includes a plurality of LED modules, in which respective modules includes LEDs and LED drivers. An LED driver is an electrical circuit configured to drive LEDs and provide illumination responsive to a switching operation of one or more switch devices. As the resolution of displays increases, LED pixel density likewise increases. The increasing pixel density constrains the size of printed circuit boards (PCBs), and the PCB space limits the number and size of LED drivers.

SUMMARY

In a described example, a circuit includes a substrate having a surface and electrically conductive lines. The electrically conductive lines extend in a direction substantially parallel to the surface and substantially orthogonal to a virtual centerline that also extends substantially parallel to the surface. The circuit also includes first and second instances of a driver device. Each of the first and second instances of the driver device has a respective first side, a respective second side opposite the first side, and respective line outputs. The line outputs are arranged along the first side of the respective instance of the driver device, and the respective first side of each of the first and second instances of the driver device are nearer the virtual centerline than the second side thereof. The line outputs of the first instance of the driver device are coupled to a first set of the electrically conductive lines at a first set of terminals, and the line outputs of the second instance of the driver device are coupled to a second set of the electrically conductive lines at a second set of terminals.

In another described example, a circuit includes a substrate, a first driver integrated circuit (IC) device and a second driver IC device. The substrate includes electrically conductive scan lines extending in a direction substantially parallel to a surface of the substrate and substantially orthogonal to a virtual centerline that also extends substantially parallel to the surface. The substrate also includes electrically conductive traces coupled between respective line output terminals of the substrate and the respective scan lines. The first driver IC device has a first side, a second side opposite the first side, first line outputs and first line switches. The first line switches are coupled to respective line outputs along the first side of the first driver IC device. The second driver IC device has a first side, a second side opposite the first side, second line outputs and second line switches. The second line switches are coupled to respective second line outputs along the first side of the second driver IC device. The first and second driver IC devices are on the surface of the substrate on opposite sides of the virtual centerline so the respective first sides thereof are nearer the virtual centerline than the respective second sides. The line outputs of the first driver IC device are coupled to a first set of the line output terminals, and the line outputs of the second driver IC device are coupled to a second set of the line output terminals.

In a further described example, a system includes a light emitting diode (LED) driver module. The LED driver module includes a substrate having a first surface and a second surface. The substrate also includes electrically conductive lines extending in a direction substantially parallel to the first surface and substantially orthogonal to a virtual centerline of the substrate also extending substantially parallel to the first surface. LEDs are on the second surface of the substrate. A first driver integrated circuit (IC) device has first and second edges. The first driver IC device includes first line outputs along the first edge of the first driver IC device, and the first line outputs are coupled to a first set of the electrically conductive lines. The first driver IC device includes first line switches coupled to respective first line outputs. A second driver IC device has first and second edges. The second driver IC includes second line outputs along the first edge of the second driver IC device, and the second line outputs coupled to a second set of the electrically conductive lines. The second driver IC device includes second line switches coupled to respective second line outputs. The first and second driver IC devices are on the first surface of the substrate on opposite sides of the virtual centerline, in which the respective first edge of the first and second driver IC devices are nearer the virtual centerline than the respective second edges.

DETAILED DESCRIPTION

Figure 1:
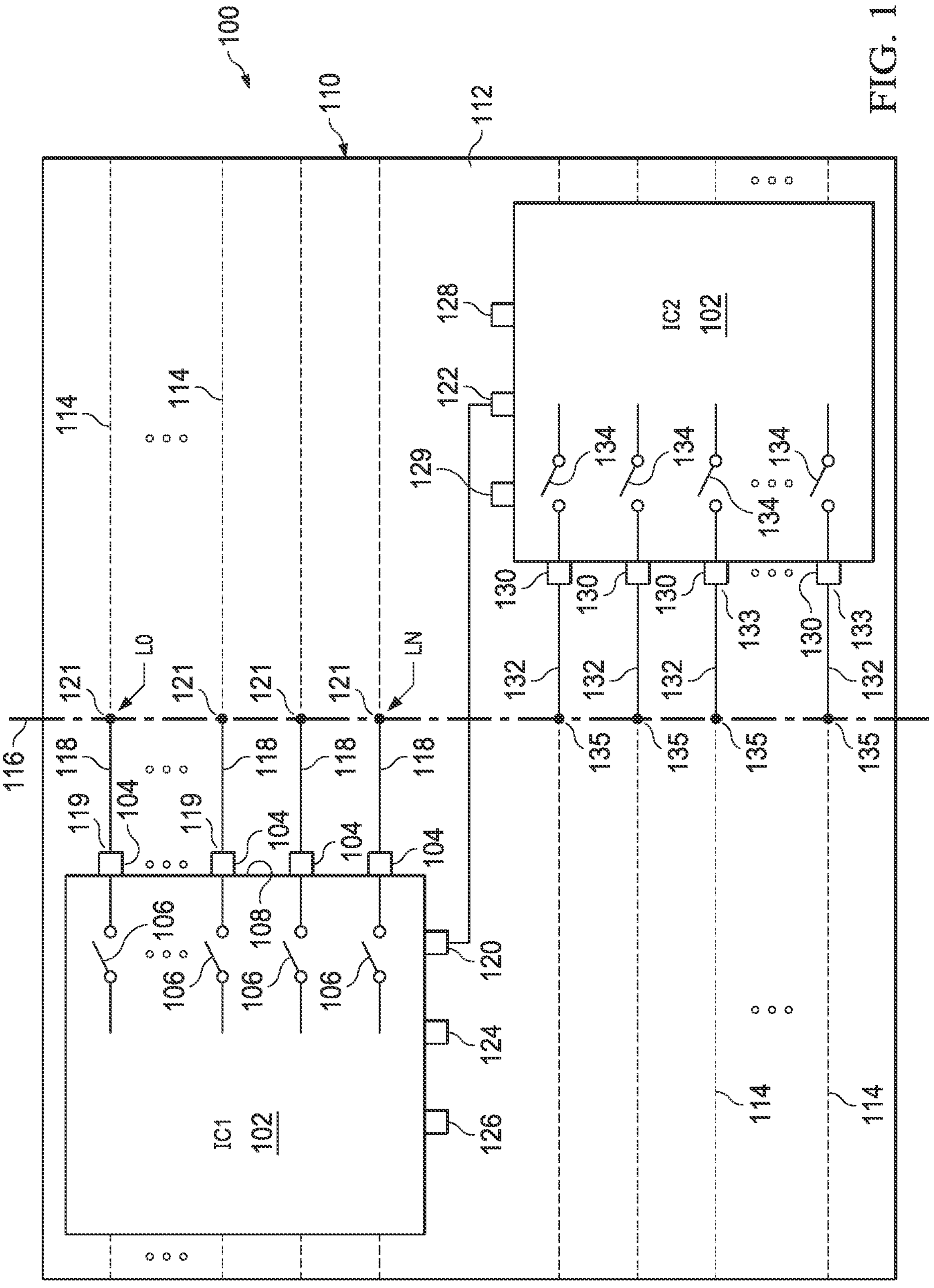
FIG. 1 illustrates an example circuit module including multiple driver devices.

Example embodiments relate to circuits and systems for driving loads. In particular examples described herein, the circuits and systems provide layouts for driver devices configured to drive light emitting diodes (LEDs), such as micro LEDs or organic LEDs (OLEDs). However, the circuits and systems described herein are not limited to driving LEDs, and can be configured to drive other types of loads, including resistive loads, other types of semiconductor devices (e.g., transistors, other diodes), motors and the like.

In an example, a circuit module includes a substrate having a surface and a plurality of electrically conductive lines. The electrically conductive lines can extend in a direction substantially parallel to the surface and substantially orthogonal to a virtual centerline of the substrate that also extends substantially parallel to the surface. Unless otherwise stated, in this description, "about," "approximately" or "substantially" preceding a value means+/−5 percent (5%) of the stated value. For example, "substantially parallel" means being within +/−4.5 degrees of exactly parallel, and "substantially orthogonal" means being within +/−4.5 degrees of exactly orthogonal. Also, the scan lines need not be straight lines, and can take other contours in the direction that they extend in the substrate. For example, the electrically conductive lines are scan lines that are spaced apart from each other and extend coextensively across the substrate, and the virtual centerline can extend over (or through) a central part of the electrically conductive lines.

The circuit module also includes a number of two more instances of a driver device mounted to the surface of the substrate. For example, each instance of the driver device is implemented as an integrated circuit (IC) device. Each instance of the driver device includes line switches coupled to respective line outputs of the respective driver device. The line outputs are located along a respective side of the driver device. For example, the respective side is a side or edge of the IC device, and the line outputs are implemented as (or are coupled to) pins or other terminals of such IC device.

Instances of the driver device are arranged on the substrate surface so that the respective sides thereof, which include the respective line outputs, are located on opposite sides of the virtual centerline. For example, the respective sides of each driver device having the respective line outputs are nearer the virtual centerline than the opposite sides thereof. In this way, the line switches are also adjacent the centerline of the substrate. The line outputs of a first instance of the driver device are coupled to a first set of the electrically conductive lines, and line outputs of another instance of the driver device are coupled to a second set of electrically conductive lines. In one example, a first set of the electrically conductive lines includes a first group of consecutive electrically conductive lines and a second set of the electrically conductive lines includes a group of different consecutive electrically conductive lines than the first group. The first and second groups of consecutive lines can be spaced apart from each other in a direction along the virtual centerline. In another example, the first and second sets of electrically conductive lines are interlaced or interdigitated with respect to each other along the direction of the virtual centerline.

Each of the instances of the driver device that are mounted to the substrate further can include memory that is programmed to store a scanning sequence for controlling the line switches in each of the respective driver devices. The scanning sequence can be representative of the respective physical order of couplings between line outputs and electrically conductive lines. That is, the scanning sequence for the driver devices can be aligned with the physical layout of the driver devices and their connections to the electrically conductive lines of the substrate.

In a further example, a plurality of LEDs can be arranged on a second surface of the substrate opposite of the surface to which the driver devices (LED driver devices) are coupled. The LEDs can be arranged in rows and columns. Each respective row or column of LEDs can be coupled to the electrically conductive lines to control current flow to the LEDs of the respective row or column. By the arrangement and layout described herein, a line switch that is coupled to a respective electrically conductive line can control LEDs that are driven by multiple LED driver devices. In this way, because line switches of one LED driver device can be used by more than one LED driver device to drive LEDs, the number of line switches can be reduced compared to other implementations. Also, by positioning the line switches near the virtual centerline (e.g., near the center of respective scan lines), parasitic inductances of the conductive lines in the substrate can be reduced, thereby improving grayscale uniformity across the array of LEDs. The examples described herein can also enable enhanced routing of layers within the substrate (e.g., a multi-layer printed circuit board).

FIG. 1 illustrates an example circuit (also referred to herein as a module) 100 including multiple driver devices 102. In the example of FIG. 1, the circuit 100 includes first and second driver devices 102, shown as IC1 and IC2, which are instances of the same driver device (e.g., an IC device). Thus, each of the driver devices 102 includes the same circuity and has the same inputs and outputs. The example of FIG. 1 includes two instance of driver devices 102, but any number of two or more driver devices can be used in circuits implemented according to this description (see, e.g., FIGS. 3 and 4). For example, each driver device 102 can be implemented as packaged IC, in which one or more IC dies are encapsulated in a packaging material according to the type of packing. In one example, the driver devices 102 are implemented in such as quad-flat packages (e.g., quad-flat no-leads (QFN) packages), ball grid array (BGA) packages, or other package types mountable on the substrate 110 (e.g., a PCB).

With reference to IC1, the driver device 102 includes line outputs 104, shown as L0-LN, where N is a positive integer representative of the number of line outputs. For example, N=4, N=8, N=12, N=16, N=32, etc. The driver device 102 also includes line switches 106 coupled to respective line outputs 104. For example, line switches 106 can be implemented as semiconductor switch devices, such as metal oxide semiconductor field effect transistors (MOSFETs, such as P-type or N-type FETs), bipolar junction transistors (BJTs), insulated gate bipolar transistors (IGBTs), laterally diffused metal oxide semiconductor (LDMOS) transistors, thyristors or the like.

As shown in the example of FIG. 1, each of the line outputs 104 of the driver device 102 are located along a given side 108 of the driver device (e.g., the same side of different instances of the same IC). For example, the driver device 102 is a LED driver device implemented as an IC device, in which the line outputs 104 are pins or terminals of the IC device. The line switches 106 are likewise located within IC1 near the side 108 of the driver device 102. The driver device 102 also includes additional circuitry (now shown) configured to control driving respective loads responsive to input signals, such as from a controller or microcontroller.

The circuit 100 also includes a substrate 110 having a surface 112 to which the driver devices 102 are coupled. The substrate 110 also includes electrically conductive lines 114 extending in a direction parallel to the surface 112 and orthogonal to a virtual centerline 116. In the example when the driver devices 102 are LED drivers, the electrically conductive lines are scan lines. The virtual centerline 116 also extends parallel to the surface 112 of the substrate 110. The electrically conductive lines 114 can be implemented on a surface or embedded in a layer of a multi-layer substrate 110. The substrate 110 further can include electrically conductive traces 118, which may be implemented on a respective layer or on multiple layers of the substrate 110. The electrically conductive traces 118 can electrically couple line outputs 104 of driver device 102 to respective electrically conductive lines 114. For example, the line outputs 104 are coupled to respective line output terminals 119 of the substrate 110 by soldering or other types of electrical bonding (e.g., electrically conductive adhesives or the like). The traces 118 are configured to provide an electrically conductive path between line output terminals 119 (to which the line outputs 104 are coupled) and the respective lines 114. In an example, the traces 118 extend between line outputs 104 and a set of substrate terminals 121 to couple respective line outputs 104 to a first set of the electrically conductive lines 114. The substrate terminals 121 can be aligned substantially along the virtual centerline, such as shown in FIG. 1. As a result, each line switch 106 is coupled to an electrically conductive line 114 (e.g., a scan line) through a respective trace 118. The traces can be implemented as electrical connectors, such as conductive wires or as layer of metal on a surface or intermediate layer of the substrate (e.g., a PCB), or other electrically conductive path.

In the configuration of FIG. 1, driver device IC1 has an output 120 coupled to an input 122 of driver device IC2. For example, the output 120 is a data output and the input 122 is a data input. The connection between output 120 and input 122 can be a trace implemented in the substrate 110 configured to enable the communication of data (e.g., digital or analog data) from an input 124 of IC1 to the input 122 of IC2. Each driver device IC1 and IC2 can also include a respective clock input 126 and 128. The clock inputs 126 and 128 are adapted to be coupled to a clock input for receiving a respective clock signal that can be used to clock the data that is provided to inputs 124 and 122 of the respective driver devices IC1 and IC2. IC2 also includes a data output 129 that is adapted to be coupled to an input of another instance of the driver device 102.

As described above, IC2 can be implemented as another instance of the same driver device 102 as IC1. Thus, the IC2 also includes line outputs 130 (shown as L0 through LN) coupled to different ones of the conductive lines 114 through respective traces 132. As described, the traces 132 are configured to provide an electrically conductive path between line output terminals 133 (to which the line outputs 130 are coupled) and the respective conductive lines 114 (e.g., scan lines). For example, the traces 132 extend between line outputs 130 and a set of substrate terminals 135 to couple respective line outputs 130 to a respective set of the electrically conductive lines 114, which is different than the conductive lines to which the line outputs 104 of IC1 are coupled. IC2 also includes line switches 134 coupled to respective line outputs 130. Each of the line switches 134 can be coupled to driver circuitry of the driver device IC2, as described herein. In the example shown in FIG. 1, the line outputs 104 of IC1 are coupled to a first set of the line output terminals, and the line outputs 130 of IC2 are coupled to a second set of the line output terminals 133. The respective traces 118 and 132 are coupled to respective substrate terminals 121 and 135 (e.g., nodes). As shown in the example of FIG. 1, the substrate terminals 121 and 135 thus can be aligned substantially along the virtual centerline 116. As a result, the line outputs 104 of driver device IC1 are coupled to a first set of the electrically conductive lines 114 and the line outputs 130 of the second driver device IC2 are coupled to a second set of the electrically conductive lines 114. In one example, the different sets of electrically conductive lines 114 to which the respective driver devices IC1 and IC2 are coupled are spaced apart sets of lines (see, e.g., FIG. 4). In another example, the different sets of electrically conductive lines 114 to which the respective driver devices IC1 and IC2 are coupled are interlaced (see, e.g., FIG. 4), such as described herein.

In an example, the circuit 100 can be implemented as a circuit module. As a circuit module, multiple modules may be coupled together to form a system. In one example, a circuit module is an LED module having an arrangement of LEDs (e.g., micro LEDs) on one side of each module and LED driver devices 102 on the other side. Multiple LED modules can be coupled together to form a display, such as a television screen or monitor (see, e.g., FIG. 7).

Figure 2:
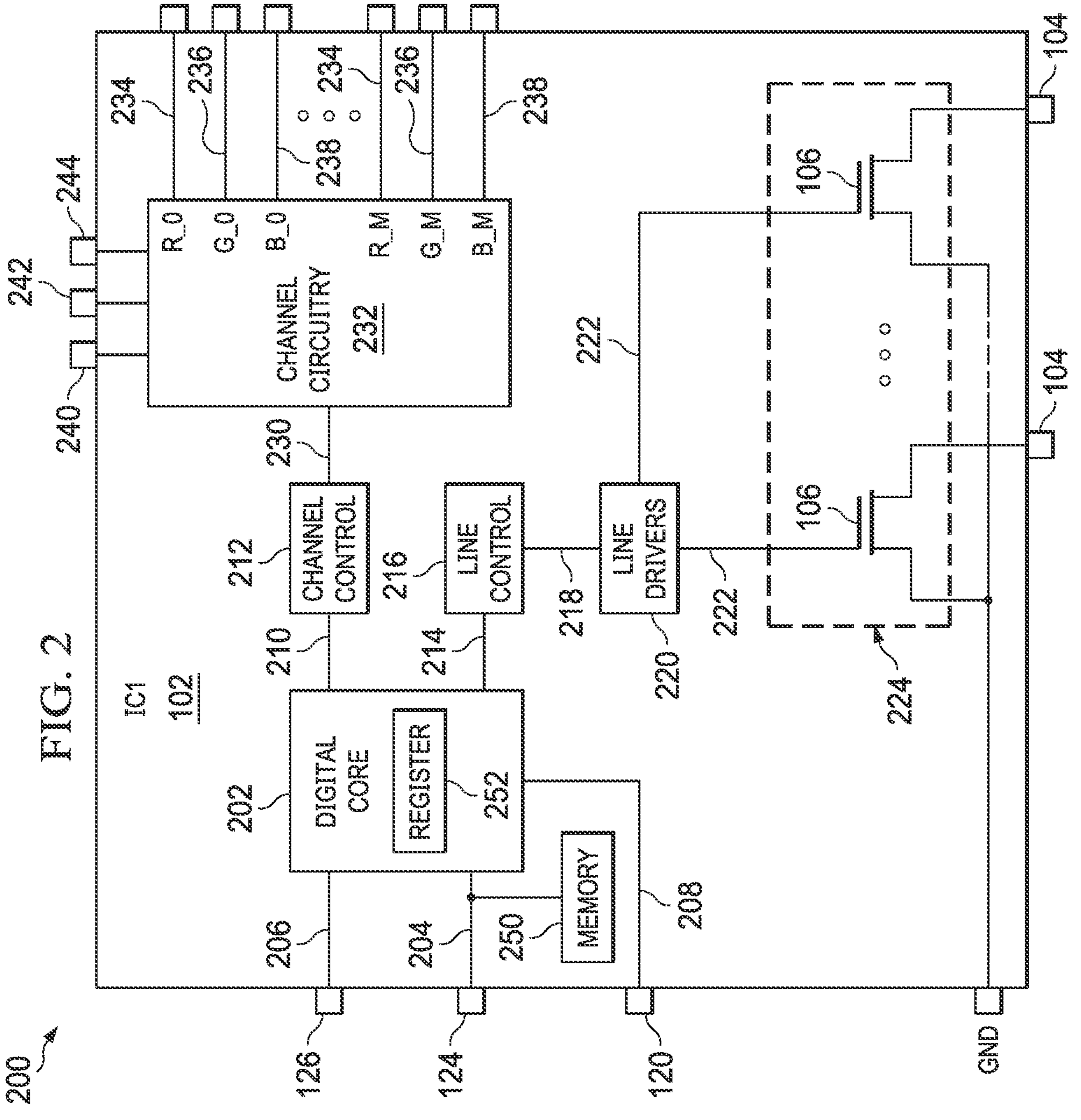
FIG. 2 illustrates an example driver device.

FIG. 2 depicts an example of an LED driver circuit 200 that can be implemented as driver devices 102 (IC1 and IC2) in the circuit 100 of FIG. 1. Accordingly, the description of FIG. 2 also refers to FIG. 1. That is, each of the driver devices IC1 and IC2 can be implemented as an instance of the example LED driver 200. As described with respect to FIG. 1, the driver device 102 can be implemented as a driver IC having respective inputs and outputs, which are adapted to be coupled to respective outputs and inputs of other circuitry. Responsive to signals received at its inputs, the LED driver 200 is configured to drive respective loads (e.g., LEDs) that are coupled to electrically conductive lines 114, such as scan lines of an LED array (or matrix).

In the example of FIG. 2, the LED driver 200 includes a digital core 202 having a data input 204, a clock input 206 and a data output 208. For IC1, the clock input 206 is coupled to terminal 126, data input 204 is coupled to terminal 124, and data output 208 is coupled to output 120 of the driver IC 200. For IC2, the clock input 206 would be coupled to terminal 128, data input 204 would be coupled to terminal 122, and data output 208 would be coupled to output terminal 129. The digital core 202 is configured to implement on-chip control for the driver device 102 (e.g., to configure registers, control the status of lines and channels) responsive to clock signal received at 126 and input data received at 124. The digital core 202 has a channel output 210 coupled to an input of channel control 212. The digital core 202 also has an output 214 coupled to line control circuit 216.

The line control circuit 216 has an output 218 coupled to line drivers 220 for providing a logic control signal (e.g., a signal pulse). The line drivers 220 have outputs 222 coupled to respective control inputs of line switches 106. The line drivers 220 can be implemented as amplifiers or buffers configured to convert the logic control signals to respective drive signals sufficient to activate respective switch devices. For example, the switch devices 106 can be implemented as MOSFETs, such as PFETs or NFETs, depending on application requirements. The arrangement of switch devices 224 thus are configured to couple respective line outputs 104 to a ground terminal GND responsive to the drive signals provided by the line driver circuit 220. Each LED that is driven by channel circuitry 232 and coupled to the line output 104 being activated, responsive to the line driver signal activating the respective switch 106, causes current flow through respective LED (or LEDs) and illumination thereof.

The channel control circuit 212 has an output 230 coupled to the channel circuitry 232. The channel control circuit 212 can be a digital circuit (e.g., logic or a processor) configured to implement digital control of the channel circuitry 232 for driving respective channels to which LEDs are coupled responsive to input data received at 204. The channel circuitry includes channel outputs 234, 236 and 238, shown as R0, G0, B0 through RM, GM, BM, where M is a positive integer representative of the number of columns driven by the LED driver 200. There that can be any number of M sets of outputs 234, 236 and 238. Each of the channel outputs 234, 236 and 238 for a respective column is adapted to be coupled to a respective red, green and blue LED. A respective set of red, green and blue LEDs in each column is further coupled to each scan line 114, such that there are 3*N LEDs in each column and 3*M LEDs in each scan line for the driver circuit 200. The channel circuitry 232 can also include voltage inputs 240, 242 and 244. For example, input 240 is adapted to be coupled to a blue input voltage. Input 242 is adapted to be coupled to a green input voltage. Input 244 is adapted to be coupled to a red input voltage.

As a further example, the channel circuitry 232 is configured to provide constant-current to one or more respective outputs 234, 236 and 238 for each color group. For example, the channel circuitry 232 is configured to drive red, green and blue LEDs through respective channel outputs 234, 236 and 238. The channel circuitry 232 also can configure multiple outputs 234, 236 and 238 in parallel to vary the constant-current capability. Different voltages and current can be applied to each output to control intensity (e.g., brightness) of the LEDs being driven through the respective outputs 234, 236 and 238 based on brightness information stored in the memory 250.

The driver device 102 also includes memory 250 having an input coupled to data input 204. For example, the memory stores brightness information, which may vary over time, for each of the LEDs coupled to the outputs 234, 236 and 238. The digital core 202 also includes a register 252. The register 252 is programmed to store scanning data that controls the sequence in which the line switches 106 are activated. The scanning data stored in register 252 can be configurable. For example, the scanning data can be programmed through a communications interface responsive to signals provided at the data and clock inputs 124 and 126, respectively.

The scanning data can specify a sequence in which respective line switches 106 are activated. The scanning sequence can include line switches implemented in multiple driver devices 102 (e.g., IC1 and IC2). For example, the scanning sequence is programmed to activate respective scan lines 114 in an order that aligns with the actual physical layout the driver module 100, particularly responsive to how outputs 104 and 130 of the respective driver devices are coupled to the scan lines 114 on the substrate 110. For example, the following table shows an example of a scanning sequence that may be implemented with respect to driver devices IC1 and IC3 having interlaced line outputs 104 and scan lines 114, such as shown in the example module 400 of FIG. 4. The LED driver 200 can implement other scanning sequences, which can vary depending on the number of line outputs and the arrangement of the scan lines 114 across the substrate 110 to which the line outputs 104 are coupled.

| SRAM Data | Lines of LED matrix | Line pins of IC1 | Line pins of IC3 |
|---|---|---|---|
| D_L0 | L0 | LS0 | |
| D_L1 | L1 | | LS15 |
| D_L2 | L2 | LS1 | |
| D_L3 | L3 | | LS14 |
| D_L4 | L4 | LS2 | |
| D_L5 | L5 | | LS13 |
| D_L6 | L6 | LS3 | |
| D_L7 | L7 | | LS12 |
| D_L8 | L8 | LS4 | |
| D_L9 | L9 | | LS11 |
| D_L10 | L10 | LS5 | |
| D_L11 | L11 | | LS10 |
| D_L12 | L12 | LS6 | |
| D_L13 | L13 | | LS9 |
| D_L14 | L14 | LS7 | |
| D_L15 | L15 | | LS8 |
| D_L16 | L16 | LS8 | |
| D_L17 | L17 | | LS7 |
| D_L18 | L18 | LS9 | |
| D_L19 | L19 | | LS6 |
| D_L20 | L20 | LS10 | |
| D_L21 | L21 | | LS5 |
| D_L22 | L22 | LS11 | |
| D_L23 | L23 | | LS4 |
| D_L24 | L24 | LS12 | |
| D_L25 | L25 | | LS3 |
| D_L26 | L26 | LS13 | |
| D_L27 | L27 | | LS2 |
| D_L28 | L28 | LS14 | |
| D_L29 | L29 | | LS1 |
| D_L30 | L30 | LS15 | |
| D_L31 | L31 | | LS0 |

By configuring the register 252 in such a way facilitates cascading of multiple instances of the driver device 102 on a driver module 100. In this context, cascading refers to combining more than one driver device in a module in such a way that makes them appear as a single driver to the rest of the circuitry in the system (e.g., a display system), such as to a microcontroller. For example, the cascaded driver devices 102 appear as one larger driver device capable of driving a larger area of the overall display than an individual driver device.

Figure 3:
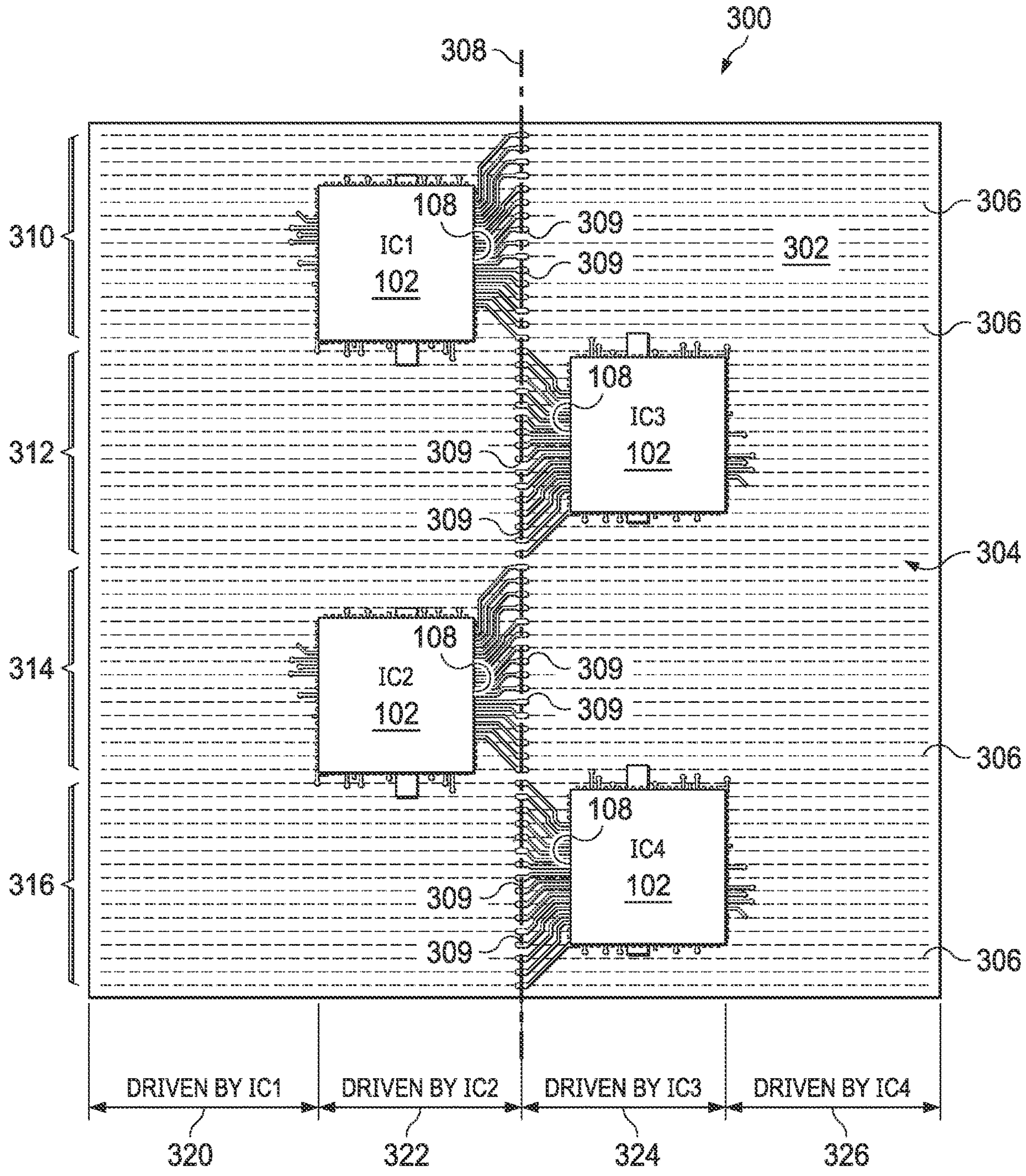
FIG. 3 illustrates an example LED circuit module including multiple LED driver devices.
Figure 4:
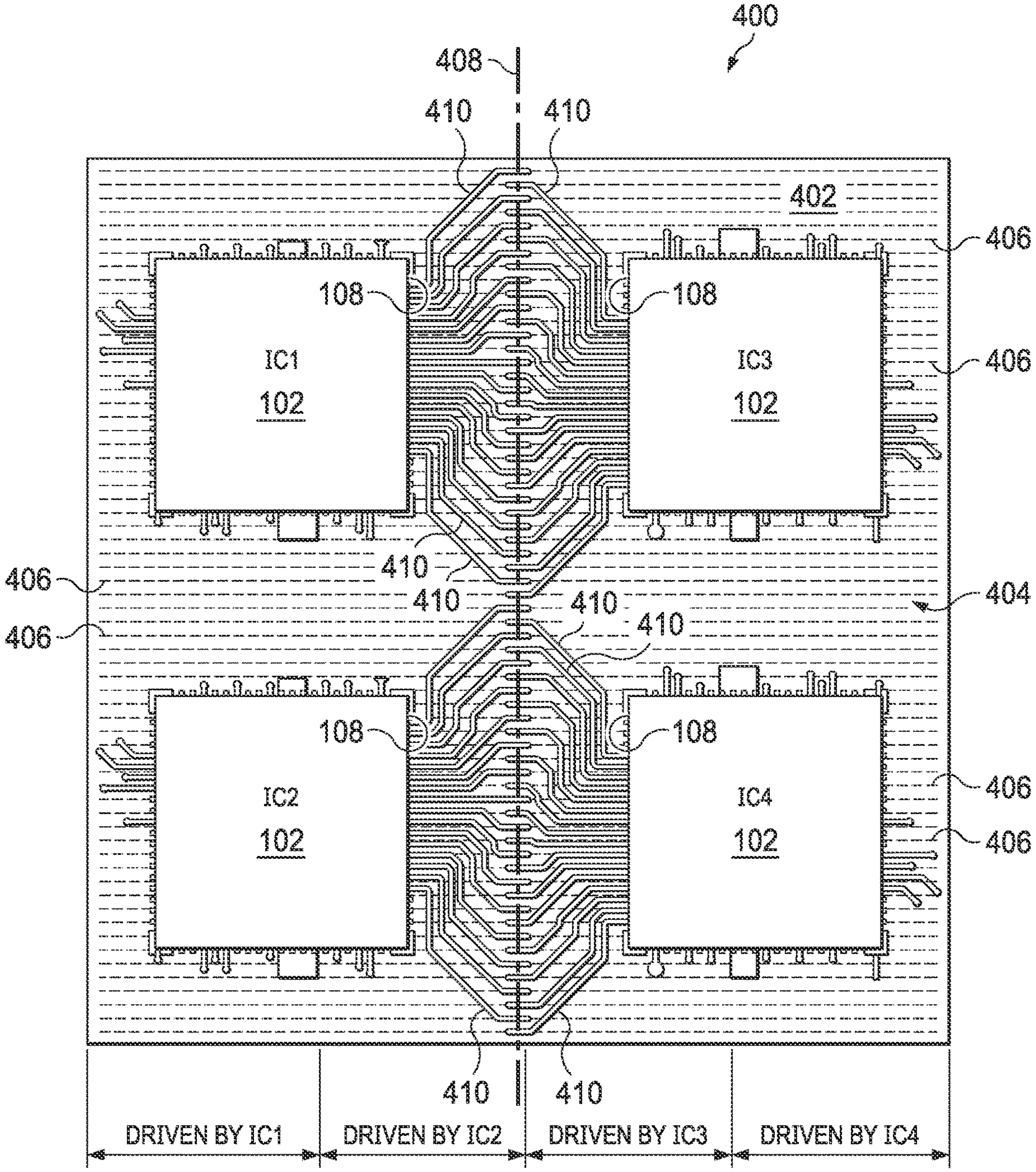
FIG. 4 illustrates another example LED circuit module including multiple LED driver devices in an interlaced layout.

FIGS. 3 and 4 illustrate examples of driver modules 300 and 400 having different arrangements of cascaded driver devices 102. Accordingly, the description of FIGS. 3 and 4 also refers to FIG. 2.

Referring to FIG. 3, the driver module 300 includes a substrate 302, such as including a multi-layer PCB. The substrate 302 includes a surface 304 and electrically conductive scan lines 306 extending through the substrate (e.g., on one or more intermediate layers). The scan lines 306 extend in a direction parallel to the surface 304 and orthogonal to a virtual centerline 308 that also extends parallel to the surface. The driver module 300 also includes multiple instances of a driver device IC 102, shown as IC1, IC2, IC3 and IC4 mounted to the surface 304. As described herein, each of the driver devices IC1, IC2, IC3 and IC4 has line outputs 104 arranged along a common side of the driver device. Each driver device IC1, IC2, IC3 and IC4 also includes line switches 106 (not shown) coupled to respective line outputs 104. The substrate 302 includes electrically conductive traces 309 configured to couple line outputs 104 to respective scan lines 306. For example, the line outputs 104 are coupled (e.g., by soldering or other coupling) to line output terminals formed on the substrate (e.g., PCB), such as at a proximal end of the traces 309 (or coupled to an end of the traces).

In the example of FIG. 3, the common side of each driver device IC1, IC2, IC3 and IC4 is located substantially symmetrically on opposite sides of the virtual centerline 308, in which IC1 and IC2 are located on one side of the virtual centerline and IC3 and IC4 are located on the other side of the virtual centerline 308. As used herein, in the context of aligning the sides 108 with respect to the virtual centerline 308, the term symmetry refers to a desired juxtaposition of the respective driver devices 102, but allows some deviation from a precise symmetric alignment. For example, the symmetry of the sides 108 can account for manufacturing tolerances and other deviation that might exist from design to design such as to accommodate other circuitry that may be on the substrate 302 (e.g., about +/−%5 variations). To place the respective sides 108 of IC3 and IC4 to be facing the virtual centerline 308, each of IC3 and IC4 can be rotated 180° about a central axis extending through the respective ICs and the surface 304 (as further shown by "IC3" and "IC4" appearing upside down in FIG. 3). As a result, the respective side 108, which contains the line outputs are facing the virtual centerline 308, which reduces the distance between respective line output terminals 133 and electrically conductive line 114. Also, the line outputs 104 of IC1 are coupled to a first group of the scan lines 310, line outputs 104 of IC3 are coupled to a second group of the scan lines 312, line outputs 104 of IC2 are coupled to a third group of the scan lines 314 and line outputs 104 of IC4 are coupled to a fourth group of the scan lines 316. Each the driver device IC1, IC2, IC3 and IC4 can configured to drive LEDs located in a respective column, shown as 320, 322, 324 and 326. As described herein, the number of line switches 106 (e.g., FETs) can be reduced because LEDs driven by each driver device can utilize line switches 106 of other devices according to the scan sequence that is implemented. Also, the configuration of driver device IC1, IC2, IC3 and IC4 on the substrate in the example of FIG. 3 enables improved routing, which can decrease parasitic differences among the LEDs being driven to provide improved grayscale uniformity across the display.

FIG. 4 illustrates an example driver module 400 showing an interlaced layout. The module 400 includes a substrate 402 similar to the module 300, except the surface area in FIG. 4 can be reduced relative to FIG. 3 due to the interlaced layout. The substrate 402 includes a surface 404 and electrically conductive scan lines 406. The scan lines 406 extend through the substrate between side edges thereof orthogonal to a virtual centerline, shown at 408. The driver module 400 also includes multiple instances of a driver device IC 102, shown as IC1, IC2, IC3 and IC4 mounted to the surface 404. As described herein, each of the driver devices IC1, IC2, IC3 and IC4 has line outputs 104 arranged along a respective side of the driver device. Each driver device IC1, IC2, IC3 and IC4 also includes line switches 106 (not shown) coupled to respective line outputs 104.

The substrate 402 includes electrically conductive traces 410 coupled to respective scan lines, which are also adapted to couple line outputs 104. For example, the traces are coupled to respective scan lines through substrate terminals (e.g., through conductive vias) coupled between the traces and the layer(s) where the scan lines reside. When driver devices IC1, IC2, IC3 and IC4 are coupled to the substrate 402, as shown in FIG. 4, the traces 410 couple the line outputs 104 to respective scan lines 406. For example, the lines outputs 104 are coupled (e.g., by soldering or other coupling) to line output terminals formed on the substrate (e.g., PCB) 402, such as at a proximal end of the traces 410 (or otherwise coupled to an end of the traces). IC1 and IC3 are configured and arranged on the substrate 402 so respective sides 108 containing line outputs 104 are facing each other, such as juxtaposed symmetrically about the centerline 408. IC2 and IC4 are likewise configured and arranged on the substrate so respective sides 108 containing line outputs 104 are facing each other. To place the respective sides 108 of IC3 and IC4 to be facing each other and the virtual centerline 408, each of IC3 and IC4 can be rotated 180° about a central axis extending through the respective ICs and the surface 304 (as further shown by "IC3" and "IC4" appearing upside down in FIG. 4).

Also, in the example of FIG. 4, the traces 410 coupled to line outputs of IC1 and IC3 are interlaced (e.g., interdigitated) along the virtual centerline 408. The traces 410 coupled to line outputs of IC2 and IC4 likewise are interlaced along the virtual centerline 408. As a result, the respective line outputs 104 of the IC1 and IC3 alternative between consecutive scan lines 406 along the virtual centerline. By interlacing the coupling between line outputs 104 and scan lines 406, the density of driver devices on the substrate can be increased compared to existing approaches as well as compared to the approach in FIG. 3. Because the density of LED driver devices can thus be increased, the pixel density of an LED (e.g., micro LED) display can likewise be increased. The interlaced layout further can reduce the number of layers needed to couple scan lines to the respective line outputs. Also, the configuration and arrangement of driver devices IC1, IC2, IC3 and IC4 on the substrate enables improved routing, which can decrease parasitic differences among the LEDs being driven to provide improved grayscale uniformity across the display.

Figure 5:
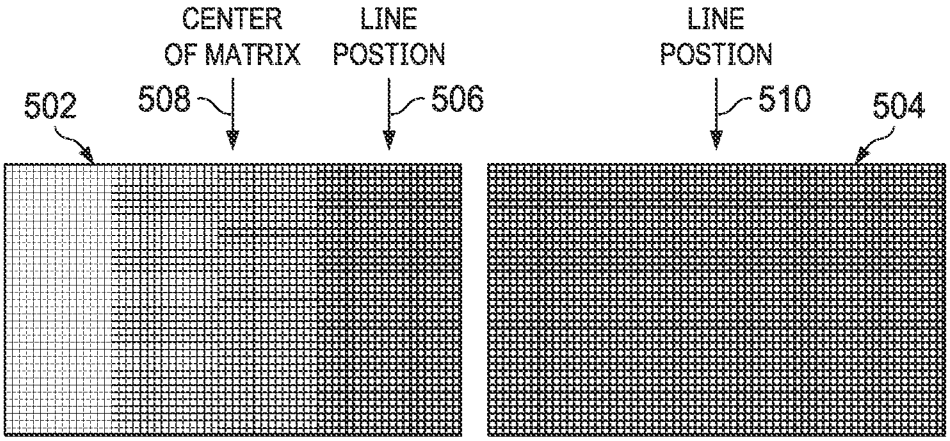
FIG. 5 illustrates examples of LED matrices illuminated by different configurations of LED driver devices.

As an example, FIG. 5 illustrates examples of LED matrices 502 and 504 driven by different configurations of LED driver devices. The matrix 502 shows an LED display in low grayscale for a layout in which with line switches (e.g., switches 106) are coupled to respective scan lines (e.g., conductive lines 114, 306, 406) at a line position 506 along on a side of an LED matrix, which is spaced apart from a center 508 of the matrix 502. The center of the matrix 508 is an example of the virtual centerline described herein. As a result of the placement of line switches at the line position 506, the illumination across the matrix 502 is not uniform. The reduced uniformity of illumination results because different parasitic inductances exist along scan lines coupled to line outputs at the line position 506 resulting in different currents being provided to two sides of the line position. By contrast, the matrix 504 shows an LED display in low grayscale for a layout in which with line switches are coupled to respective scan lines (e.g., lines 114, 306, 406) at a line position 510 the center of the matrix. As a result of the placement of line switches at the line position 510, the illumination across the matrix 504 exhibits improved uniformity than that of matrix 502.

Figure 6A:
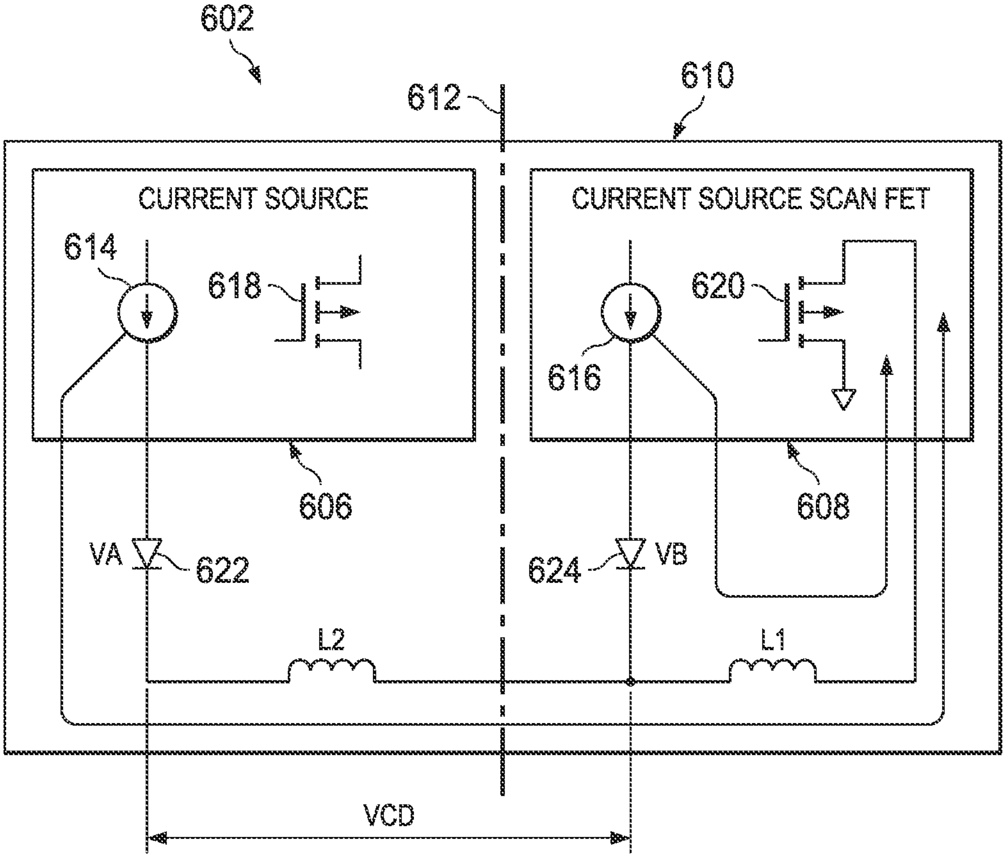
FIGS. 6A and 6B are circuit diagrams showing output line switch devices in different locations relative to a center of an LED matrix.
Figure 6B:
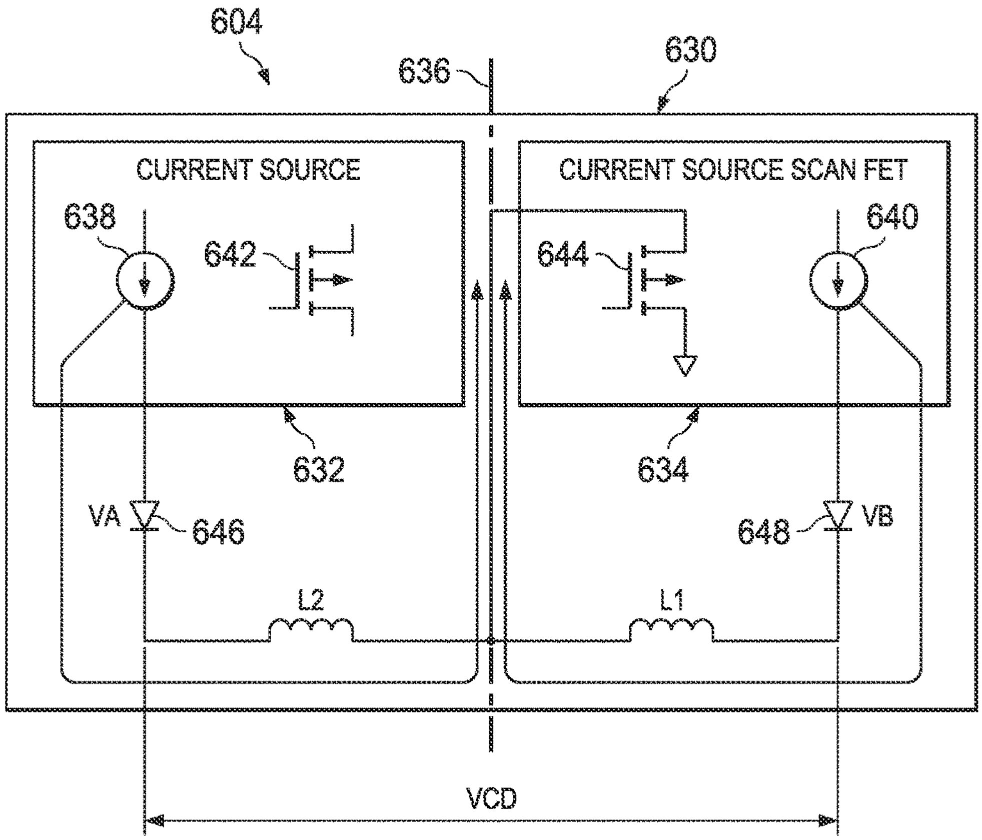

As a further example FIGS. 6A and 6B are simplified circuit diagrams 602 and 604 showing output line switch devices in different configurations. In the example of FIG. 6A, the circuit includes driver devices 606 and 608, such as can be implemented as instances of the driver device 102, mounted to a substrate that includes an LED matrix (e.g., a circuit module) 610. The driver devices 606 and 608 are positioned on opposite sides of a virtual centerline 612. Each of the driver devices 606 and 608 thus includes current sources 614, 616 and line switches, shown as FETs 618, 620. Respective LEDs 622 and 624 are coupled between current sources 614 and 616 and the FET 620. For example, current source 614 and 616 can be implemented in channel circuitry 232, and be configured to supply current to LEDs along a column of the matrix (one of which is shown at 622, 624 for respective columns). As shown in FIG. 6A, the circuit diagram 602 thus is representative of an existing approach in which line switches 620 of driver device 608 are coupled to respective scan line at a position (e.g., line position 506 in FIG. 5) spaced further apart from the centerline 612 than switches 618. As a result of the placement of the FET the parasitic inductance L1 in the line between FET 620 and LED 624 is less than the inductance L2 between the FET 620 and LED 622. The difference in inductances L1 and L2 results in a potential difference between the cathodes of LEDs 620 and 622 (shown as VCD, where VCD=VA−VB). As shown in FIG. 6, when the line FET 620 is nearer one side of LED matrix 610, the LED 624 nearer the line FET 620 has a lower voltage drop than the LED 622 that is further way from the FET 620 because the parasitic inductance of electrically conductive path between the FET 620 and the respective LEDs 622 and 624. Thus, the LEDs 622 which are far away from line FETs thus are brighter than LEDs 624 that are nearer the line FETs 620.

FIG. 6B is an example embodiment of a circuit module implemented as an LED matrix 630 as described herein. For example, the LED matrix 630 is an example of modules 100, 300, 400, which includes a matrix of LEDs on one surface of a substrate and respective driver devices 632 and 634 on an opposite surface. Driver devices 632 and 632, such as can be implemented as instances of the driver device 102. The driver devices 632 and 634 are positioned on opposite sides of a virtual centerline 636. As in the example of FIG. 6A, each of the driver devices 632 and 634 includes current sources 638, 640 and line FETs 642, 644. Respective LEDs 646 and 648 are coupled between current sources 638 and 640 and the line FET 644. In the example of FIG. 6B, line FET 644 of driver device 634 is coupled to respective scan line at a position (e.g., line position 510 in FIG. 5) along or near the centerline 636. As a result, the parasitic inductances L1 and L2 approximate each other, such that responsive to activation of the FET 644, currents and voltages applied to respective LEDs 646 and 648 are uniform. As a result, the illumination across the LED matrix (e.g., matrix 504) also is uniform.

Figure 7:
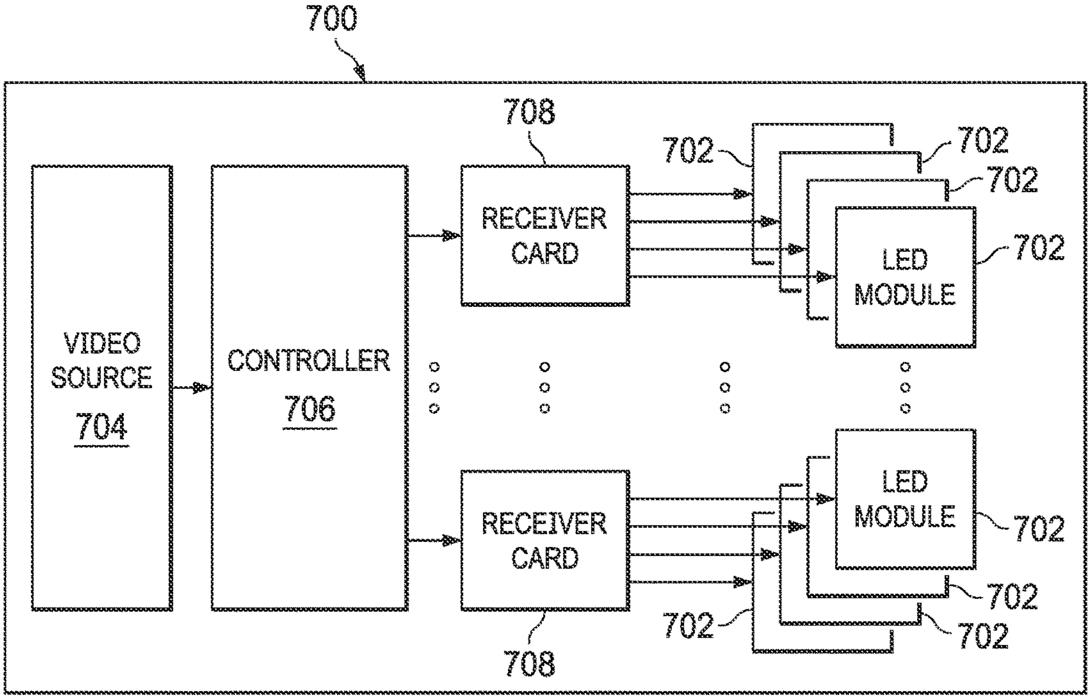
FIG. 7 is a block diagram showing an example display system.

FIG. 7 is a block diagram showing an example display system 700. For example, the system is a micro LED TV having a display screen that includes a plurality of LED modules 702. Each of the modules can be implemented according to any of the example modules 100, 300, 400, 604 described herein. For example, micro LEDs are on one side of each LED module and LED drivers are on the backside of LED modules. In an example, the system 700 includes one or more video sources 704 configured to provide video data, such as a stream of digital data encoding video pictures according to a video protocol. The sources can include live television, streaming media or the like. A controller 706 has an input coupled to an output of the video source 704 to receive the video data. The controller 706 is configured to transfer and distribute video data from the video source to receiver cards 708 through a communications link (e.g., wireless transmission, Ethernet or the like). Each receiver card 708 is configured to transfer the video data to LED drivers of each LED module 702 through a protocol implemented by the LED drivers. The LED drivers are configured to control respective LEDs responsive to the video data received from the respective receiver card, including controlling line switches (e.g., FETs) to activate respective scan lines according a scanning sequence to illuminate respective LEDs. As described herein, the scanning sequence of the scan lines can be stored in memory and depend on the physical layout of LED drivers on each of the respective modules 702. For example, the scanning sequence is programmed to be representative of a physical layout of connections between the line outputs and the electrically conductive lines along the virtual centerline of each of the modules 702.

In this application, the term "couple" or "couples" means either an indirect or direct connection. Thus, if a first device couples to a second device, that connection may be through a direct connection or through an indirect connection via other devices and connections. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. An electrical circuit for driving light emitting diodes (LEDs) comprising:
- a substrate including a plurality of scan lines substantially orthogonal to a virtual centerline of the substrate;
- a first driver integrated circuit (IC) on the substrate, the first driver IC including:
  - a set of line switches coupled to a first set of the plurality of scan lines along a side of the first driver IC nearest the virtual centerline;
  - a data output; and
  - a register, via a digital core, configured to store scanning data to control activation of a sequence of the set of line switches, wherein the scanning data is configured to be programmed through a communications interface responsive to signals provided at a data input and a clock input; and
- a second driver IC on the substrate, the second driver IC including:
  - a set of line switches coupled to a second set of the plurality of scan lines along a side of the second IC nearest the virtual centerline; and
  - a data input coupled to the data output of the first driver IC,
- wherein the first driver IC is configured to control the set of line switches of the second driver IC based on a scanning sequence of the plurality of scan line switches.

2. The electrical circuit of claim 1, wherein:
- the first set of the plurality of scan lines are interlaced with the second set of the plurality of scan lines.

3. The electrical circuit of claim 1, wherein:
- the first driver IC and the second driver IC are each respective light emitting diode (LED) driver IC devices;
- a first surface of the substrate includes the first driver IC and the second driver IC; and
- a second surface of the substrate includes an array of LEDs arranged in a matrix of rows and columns of LEDs.

4. The electrical circuit of claim 3, wherein:
- each of the rows of LEDs in the array of LEDs is coupled to a respective one of the plurality of scan lines.

5. The electrical circuit of claim 3, wherein:
- the first driver IC is configured to drive a first set of the columns of LEDs in the array of LEDs; and
- the second driver IC is configured to drive a second set of the columns of LEDs in the array of LEDs.

6. The electrical circuit of claim 5, wherein:

the register is configured to define a scanning sequence of the plurality of scan lines.

7. The electrical circuit of claim 6, wherein:

in response to the scanning sequence, the first driver IC is configured to control one or more of the set of line switches of the second driver IC to drive one or more LEDs in the first set of columns of LEDs.

8. A system for driving light emitting diodes (LEDs) comprising:

a substrate including a plurality of scan lines substantially orthogonal to a virtual centerline of the substrate;

a first driver integrated circuit (IC) on a first side of the substrate, the first driver IC including:

a set of line switches coupled to a first set of the plurality of scan lines along a side of the first driver IC nearest the virtual centerline;

a data output; and a register, via a digital core, configured to store scanning data to control activation of a sequence of the set of line switches, wherein the scanning data is configured to be programmed through a communications interface responsive to signals provided at a data input and a clock input;

a second driver IC on the first side of the substrate, the second driver IC including:

a set of line switches coupled to a second set of the plurality of scan lines along a side of the second IC nearest the virtual centerline; and a data input coupled to the data output of the first driver IC; and a matrix of light emitting diodes (LEDs) on the second side of the substrate, the matrix including rows and columns of LEDs, wherein each of the rows of LEDs of the matrix is coupled to a respective one of the plurality of scan lines, wherein the first driver IC is configured to control the set of line switches of the second driver IC based on a scanning sequence of the plurality of scan line switches.

9. The system of claim 8, wherein:

the first set of the plurality of scan lines are interlaced with the second set of the plurality of scan lines.

10. The system of claim 8, wherein:

the first driver IC and the second driver IC are each respective LED driver IC devices.

11. The system of claim 8, wherein:

the first driver IC is configured to drive a first set of the columns of LEDs in the matrix of LEDs; and the second driver IC is configured to drive a second set of the columns of LEDs in the matrix of LEDs.

12. The system of claim 8, wherein:

the register is configured to define a scanning sequence of the plurality of scan lines.

13. The system of claim 12, wherein:

in response to the scanning sequence, the first driver IC is configured to control one or more of the set of line switches of the second driver IC to drive one or more LEDs in the first set of columns of LEDs.

14. An electrical circuit for driving light emitting diodes (LEDs) comprising:

a substrate including a plurality of scan lines substantially orthogonal to a virtual centerline of the substrate;

a first driver integrated circuit (IC) on a first side of the substrate, the first driver IC including a set of line switches coupled to a first set of the plurality of scan lines along a side of the first driver IC nearest the virtual centerline; and a second driver IC on the first side of the substrate, the second driver IC including a set of line switches coupled to a second set of the plurality of scan lines along a side of the second IC nearest the virtual centerline;

wherein the first driver IC is configured to control the set of line switches of the second driver IC based on a scanning sequence of the plurality of scan lines;

wherein the scanning sequence is stored in a register via a digital core; and wherein the scanning sequence is configured to be programmed through a communications interface responsive to signals provided at a data input and a clock input.

15. The electrical circuit of claim 14, wherein:

the first set of the plurality of scan lines are interlaced with the second set of the plurality of scan lines.

16. The electrical circuit of claim 14, wherein:

the first driver IC and the second driver IC are each respective light emitting diode (LED) driver IC devices; and a second side of the substrate includes a plurality of LEDs in a matrix of rows and columns.

17. The electrical circuit of claim 16, wherein:

each of the rows of LEDs is coupled to a respective one of the plurality of scan lines.

18. The electrical circuit of claim 16, wherein:

the first driver IC is configured to drive a first set of the columns of LEDs; and the second driver IC is configured to drive a second set of the columns of LEDs.

19. The electrical circuit of claim 14, wherein:

the scanning sequence of the plurality of scan lines is stored in the register of the first driver IC.

20. The electrical circuit of claim 14, wherein:

a data output terminal of the first driver IC is coupled to a data input terminal of the second driver IC.

* * * * *